(12) United States Patent
Lubomirsky

(10) Patent No.: US 6,501,192 B1
(45) Date of Patent: Dec. 31, 2002

(54) THREE PHASE RECTIFIER CIRCUIT WITH VIRTUAL NEUTRAL

(75) Inventor: Vadim Lubomirsky, Rochester, NY (US)

(73) Assignee: ENI Technology, Inc., Rochester, NY (US)

( * ) Notice: Subject to any disclaimer, the term of this patent is extended or adjusted under 35 U.S.C. 154(b) by 0 days.

(21) Appl. No.: 09/993,276

(22) Filed: Nov. 16, 2001

(51) Int. Cl.[7] .................................................. H02J 1/10
(52) U.S. Cl. ........................................................ 307/18
(58) Field of Search ............................. 363/68, 69, 67; 307/24, 18

(56) References Cited

U.S. PATENT DOCUMENTS 5,124,904 A * 6/1992 Paice .............................. 363/3
5,406,470 A * 4/1995 Ridley et al. ............... 323/207

* cited by examiner

Primary Examiner—Shawn Riley
(74) Attorney, Agent, or Firm—Harness, Dickey & Pierce, P.L.C.

(57) ABSTRACT

A rectifier circuit powers three power conversion modules using a three phase AC input without a neutral connection. First, second and third bridge rectifiers are connected to first, second and third phases of the three phase AC input and produce first, second and third rectified waveforms, respectively. A connection between the first, second and third bridge rectifiers forms a virtual neutral. Capacitors are connected across the bridge rectifies to filter the rectified waveforms and to create a DC rail voltage. The DC rail voltages feed power conversion modules. Two of the three power conversion modules remain powered at a decreased voltage level when the remaining power conversion module fails. Inductors are connected between the bridge rectifiers and the capacitors to further smooth the DC rail voltages and increase the power factor. Alternately, inductors are connected between the phases of the three phase AC input and the bridge rectifiers.

18 Claims, 7 Drawing Sheets

THREE PHASE RECTIFIER CIRCUIT WITH VIRTUAL NEUTRAL

FIELD OF THE INVENTION

The present invention relates to rectifier circuits, and more particularly to rectifier circuits that rectify three phase AC power sources without a neutral connection.

BACKGROUND OF THE INVENTION

Rectifier circuits are commonly used for converting an alternating current (AC) signal into a direct current (DC) signal. Applications that require either DC power AC power at a different frequency initially require the 50–60Hz three phase AC power to be rectified. The rectified DC power can then be used or processed using power conversion modules.

Some applications require DC power at a higher or lower level than the rectified DC voltage. In this situation, a power conversion module converts the DC power to the desired higher or lower DC level. When AC power at a different frequency or voltage is desired, the rectified DC power is inverted by a power conversion module to AC at the desired voltage or frequency.

In some situations, it is desirable to run a DC-AC power conversion module without using a regulated DC power supply. Certain types of power conversion modules (especially 1MHz and up) become significantly less efficient as their DC supply voltage is increased.

There are many applications for power conversion modules that are supplied by 400VAC (common in foreign countries) or 480VAC (common in the United States) mains. These applications include RF amplifiers and RF generators. The standard practice for high frequency power conversion modules is to connect two or more lower voltage power conversion modules in series. However, if one of the series connected modules fails during operation, the whole system fails. It is also difficult to share the rectified DC voltage input evenly between the series connected power conversion modules.

When the AC supply is three phase, three AC signals and a ground and/or neutral are typically provided. When the neutral is available, the voltages that are delivered to the circuit can be phase-to-phase or phase-to-neutral. In many facilities, however, the neutral connection is not available. When no neutral connection is available, the voltages that are delivered to the circuit can be only phase-to-phase. The phase-to-neutral voltages are typically lower than the phase-to-phase voltages by a factor that is equal to √3. The lower voltages allow higher efficiency in DC-AC high frequency applications and a phase-to-neutral connection would be utilized if availability of the neutral connection was guaranteed. Also, there are current restrictions for the neutral wires, and any application which utilizes a neutral connection provided by their facility is subject to those restrictions.

SUMMARY OF THE INVENTION

A rectifier circuit according to the present invention powers three identical power conversion modules using a three phase AC input without a neutral connection from a power line. A first bridge rectifier is connected to a first phase of the three phase AC input and produces a first rectified waveform. A second bridge rectifier is connected to a second phase of the three phase AC input and produces a second rectified waveform. A third bridge rectifier is connected to a third phase of the three phase AC input and produces a third rectified waveform. A connection between the first, second, and third bridge rectifiers forms a virtual neutral.

In other features of the invention, capacitors are connected across the bridge rectifies to filter the rectified waveforms and to create a DC rail voltage. The three DC rail voltages are of equal magnitude. The three DC rail voltages feed three power conversion modules. Two of the three power conversion modules remain powered at a decreased voltage level when the remaining power conversion module fails.

In yet other features, inductors are connected between the bridge rectifiers and the capacitors to further smooth the DC rail voltages and increase the power factor. Alternately, inductors are connected between the phases of the three phase AC input and the bridge rectifiers to smooth the DC rail voltage and to increase the power factor.

In still other features of the invention, the bridge rectifiers include first, second, third, and fourth diodes, each with an anode and a cathode. The anode of the first diode is connected to the cathode of the second diode. The cathode of the first diode is connected to the cathode of the third diode. The anode of the second diode is connected to the anode of the fourth diode. The anode of the third diode is connected to the cathode of the fourth diode. The anode of the first diode of the first bridge rectifier is connected to the first phase of the three phase AC input. The anode of the first diode of the second bridge rectifier is connected to the second phase of the three phase AC input. The anode of the first diode of the third bridge rectifier is connected to the third phase of the three phase AC input. The virtual neutral includes a conductor that connects the anode of the third diode of the first bridge rectifier, the anode of the third diode of the second bridge rectifier, and the anode of the third diode of the third bridge rectifier.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
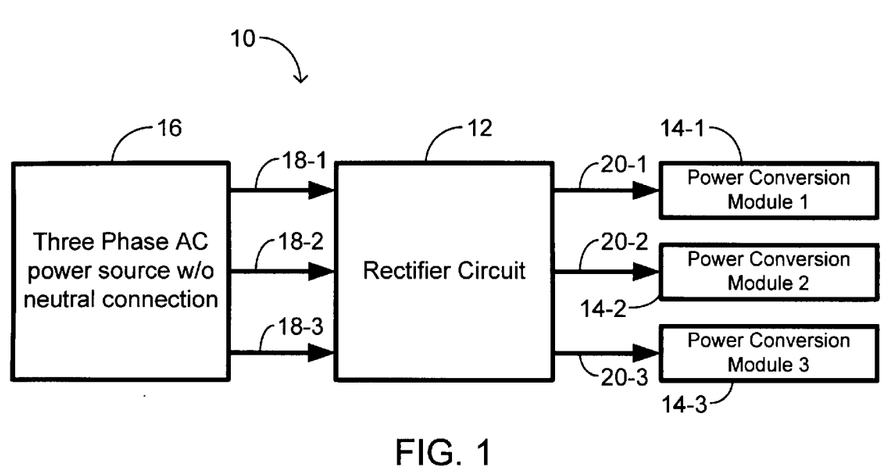
FIG. 1 is a functional block diagram illustrating a rectifier circuit that is connected to three power conversion modules and a three phase AC power source without a neutral connection according to the present invention.

Referring now to FIG. 1, a power conversion circuit 10 includes a rectifier circuit 12 that powers three power conversion modules 14-1, 14-2 and 14-3. A three phase AC power source 16 without a neutral connection is connected to the rectifier circuit 12. The three phase AC power source 16 outputs three AC sinusoidal voltage outputs 18-1, 18-2 and 18-3. The rectifier circuit 12 converts the AC sinusoidal voltages into DC rail voltage outputs 20-1, 20-2 and 20-3 that are output to three power conversion modules 14-1, 14-2 and 14-3.

Figure 2:
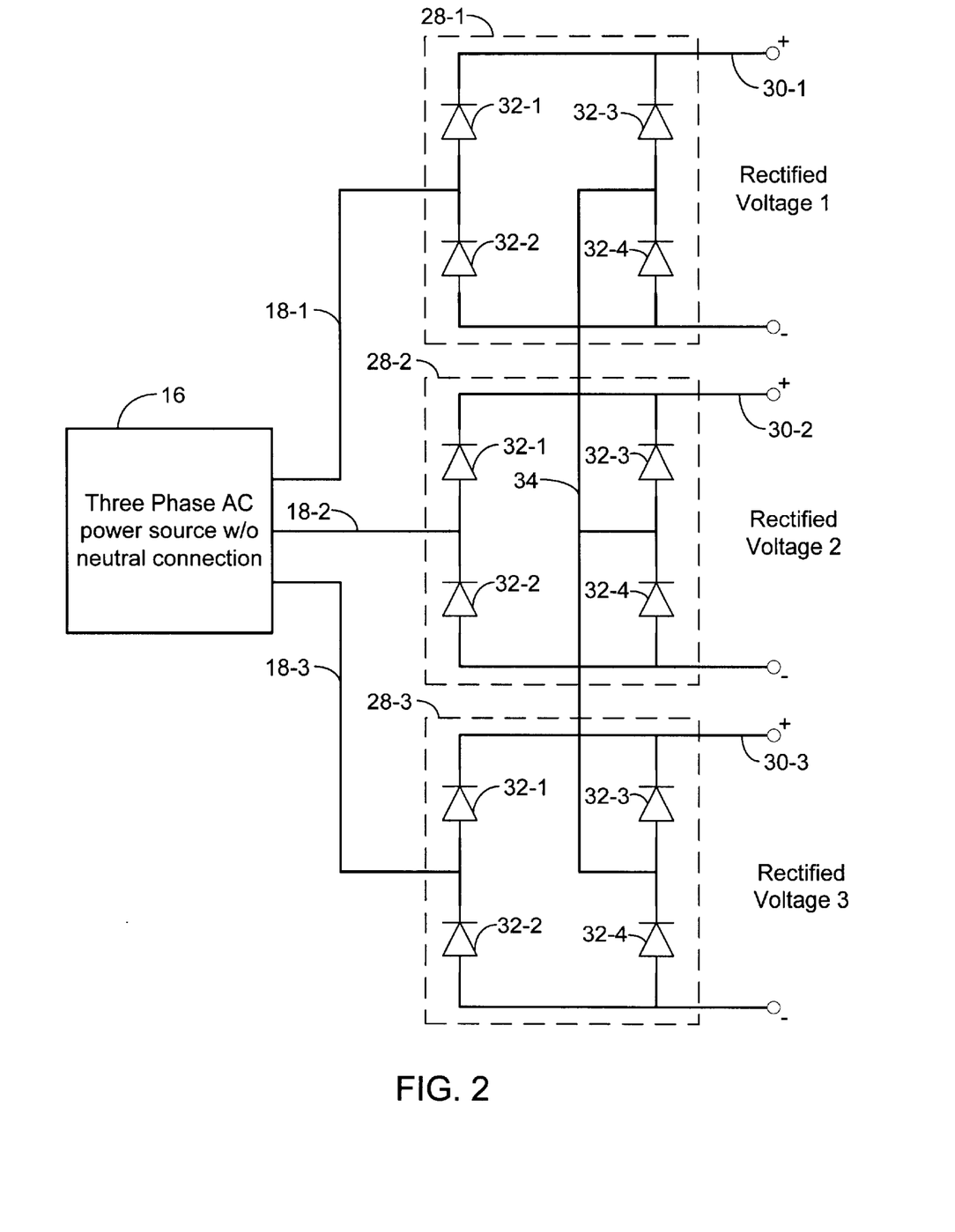
FIG. 2 is a schematic showing three bridge rectifiers that convert the three phase AC power source without a neutral connection into three rectified waveforms.

Referring now to FIG. 2, the bridge rectifiers 28-1, 28-2 and 28-3 are connected to the phases of the three phase AC power source 16. The phases of the three phase AC power source 16 produce AC sinusoidal voltage outputs 18-1, 18-2 and 18-3. The bridge rectifiers 28-1, 28-2 and 28-3 rectify the AC sinusoidal voltage outputs 18-1, 18-2 and 18-3 and produce rectified voltage outputs 30-1, 30-2 and 30-3. The bridge rectifiers 28-1, 28-2 and 28-3 invert the negative portions of the AC sinusoidal voltage outputs 18-1, 18-2 and 18-3. This is accomplished by the specific arrangement of the diodes 32 that make up the bridge rectifiers 28-1, 28-2 and 28-3.

The bridge rectifiers 28-1, 28-2 and 28-3 are comprised of four diodes 32-1, 32-2, 32-3 and 32-4, each having an anode and a cathode. The anode of the first diode 32-1 is connected to the cathode of the second diode 32-2. The cathode of the first diode 32-1 is connected to the cathode of the third diode 32-3. The anode of the second diode 32-2 is connected to the anode of the fourth diode 32-4. The anode of the third diode 32-3 is connected to the cathode of the fourth diode 32-4.

Additionally, the anode of the first diode 32-1 of the bridge rectifiers 28-1, 28-2 and 28-3 is connected to one voltage output 18-1, 18-2 and 18-3, respectively, of the three phase AC power source 16. A connection 34 is made between the bridge rectifiers 28-1, 28-2 and 28-3 that forms a virtual neutral. The virtual neutral connection 34 includes a conductor that connects the anode of the third diode 32-3 of the three bridge rectifiers 28-1, 28-2 and 28-3.

Figure 3:
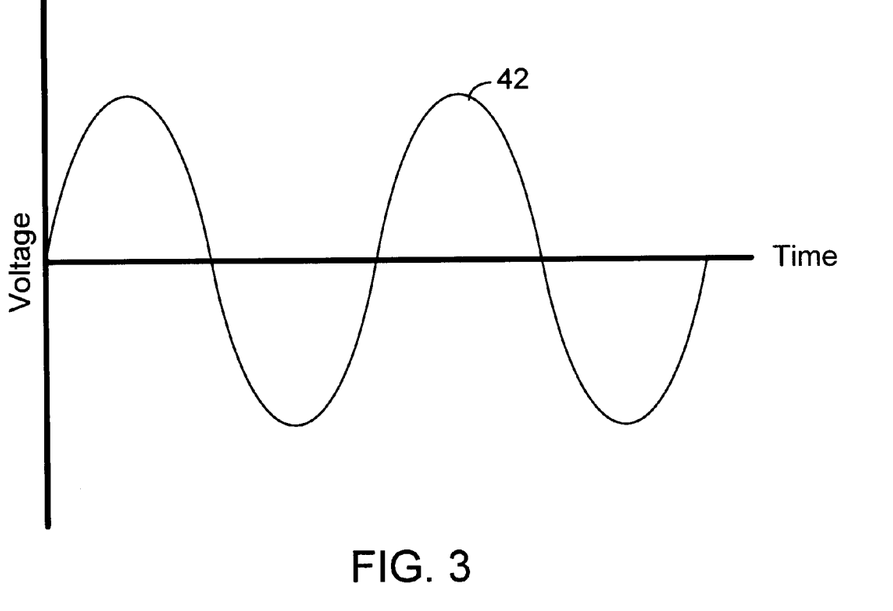
FIG. 3 illustrates a waveform that is produced by the three phases of the three phase AC power source.
Figure 4:
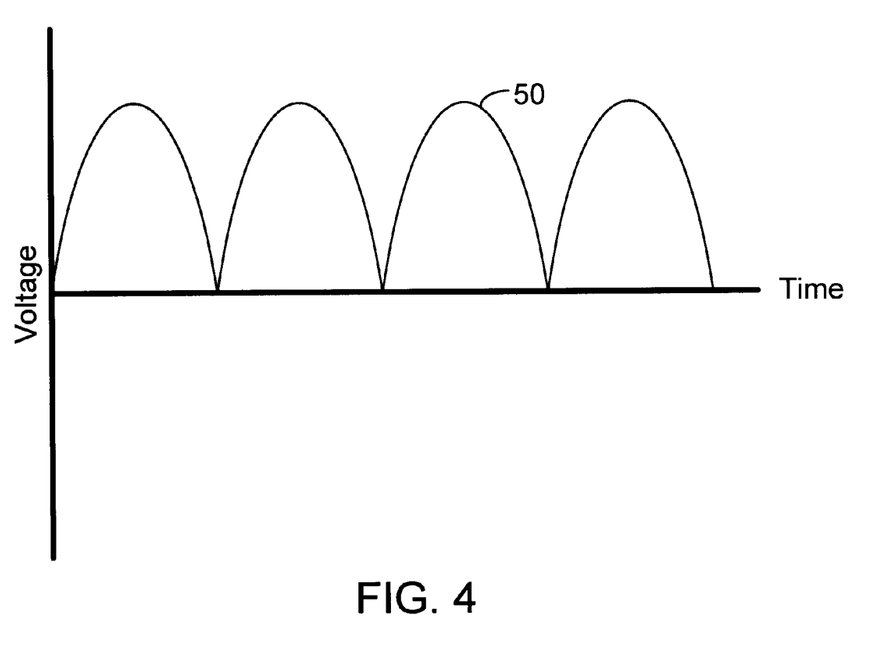
FIG. 4 illustrates a waveform that is produced by the three bridge rectifiers.

FIG. 3 illustrates an exemplary waveform 42 that is produced by the phases of the three phase AC power source 16. The waveforms of each phase are offset by 1200 from each other. FIG. 4 illustrates an exemplary waveform 50 that is produced by the bridge rectifiers 28-1, 28-2 and 28-3. As previously discussed above, the diodes 32 rectify the waveform 42 of the AC sinusoidal voltages 18-1, 18-2 and 18-3 that are shown in FIG. 3.

Figure 5:
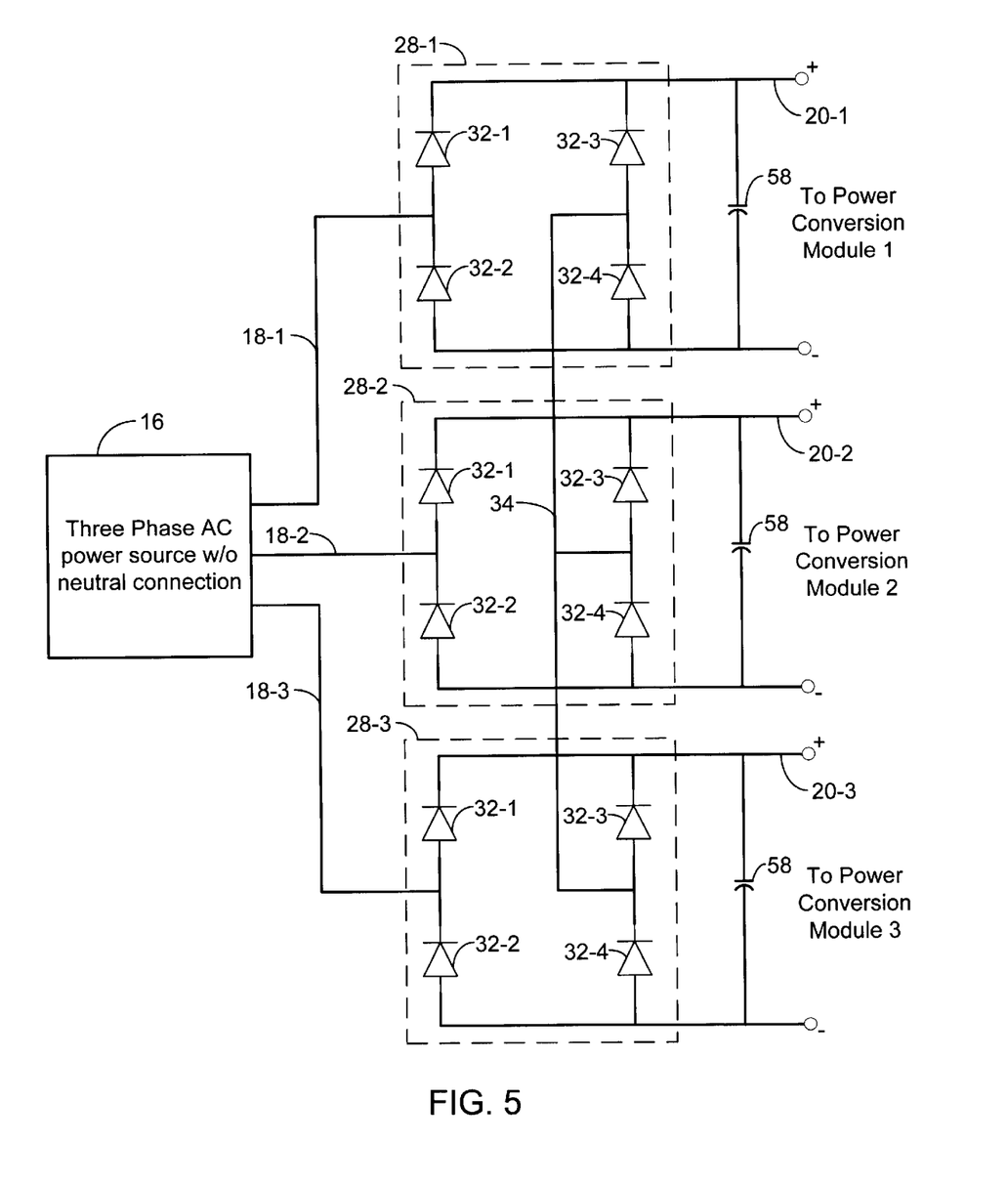
FIG. 5 is a schematic showing bridge rectifiers and capacitors that convert the three phase AC power source without a neutral connection into three DC rail voltages.

Referring now to FIG. 5, capacitors 58 are preferably used to smooth the rectified voltage. For purposes of clarity, reference numbers from FIG. 2 are used in FIG. 5 to identify similar elements. The bridge rectifiers 28-1, 28-2 and 28-3 and capacitors 58 convert the AC sinusoidal voltage outputs 18-1, 18-2 and 18-3 from the three phase AC power source 16 into DC rail voltage outputs 20-1, 20-2 and 20-3. The capacitors 58 filter the rectified voltages 30-1, 30-2 and 30-3 by smoothing the voltage peaks that are shown on the waveform 50 of FIG. 4. The result is an approximately constant voltage output. The DC rail voltage outputs 20-1, 20-2 and 20-3 of the rectifier circuit 12 are of substantially equal magnitude. Additionally, the DC rail voltage outputs 20-1, 20-2 and 20-3 feed power conversion modules 14-1, 14-2 and 14-3. If any one of the three power conversion modules 14-1, 14-2 and 14-3 fail during operation, the remaining two power conversion modules 14-1, 14-2 and 14-3 will remain powered at a decreased voltage level.

Figure 6:
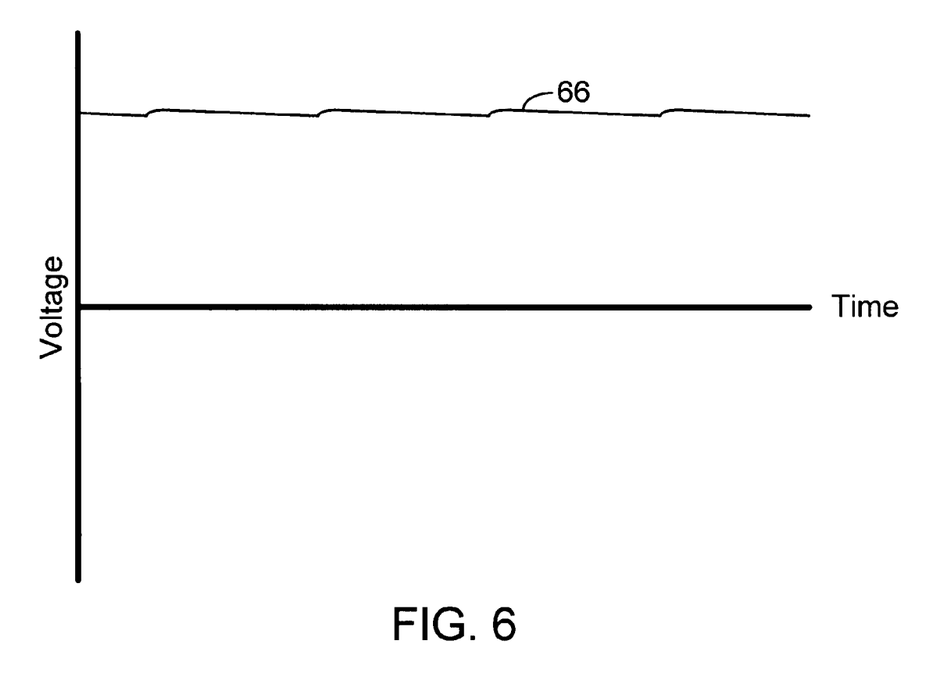
FIG. 6 illustrates tile waveform that is produced by the three capacitors of FIG. 5.

FIG. 6 illustrates the waveform 66 that is produced by the capacitors 58. A plot of the DC rail voltages 20-1, 20-2 and 20-3 as a function of time is shown. As discussed above, the capacitors 58 filter the rectified voltage outputs 30-1, 30-2 and 30-3 from the bridge rectifiers 28-1, 28-2 and 28-3 by smoothing the peak voltages of the waveform 50 of FIG. 4.

Figure 7:
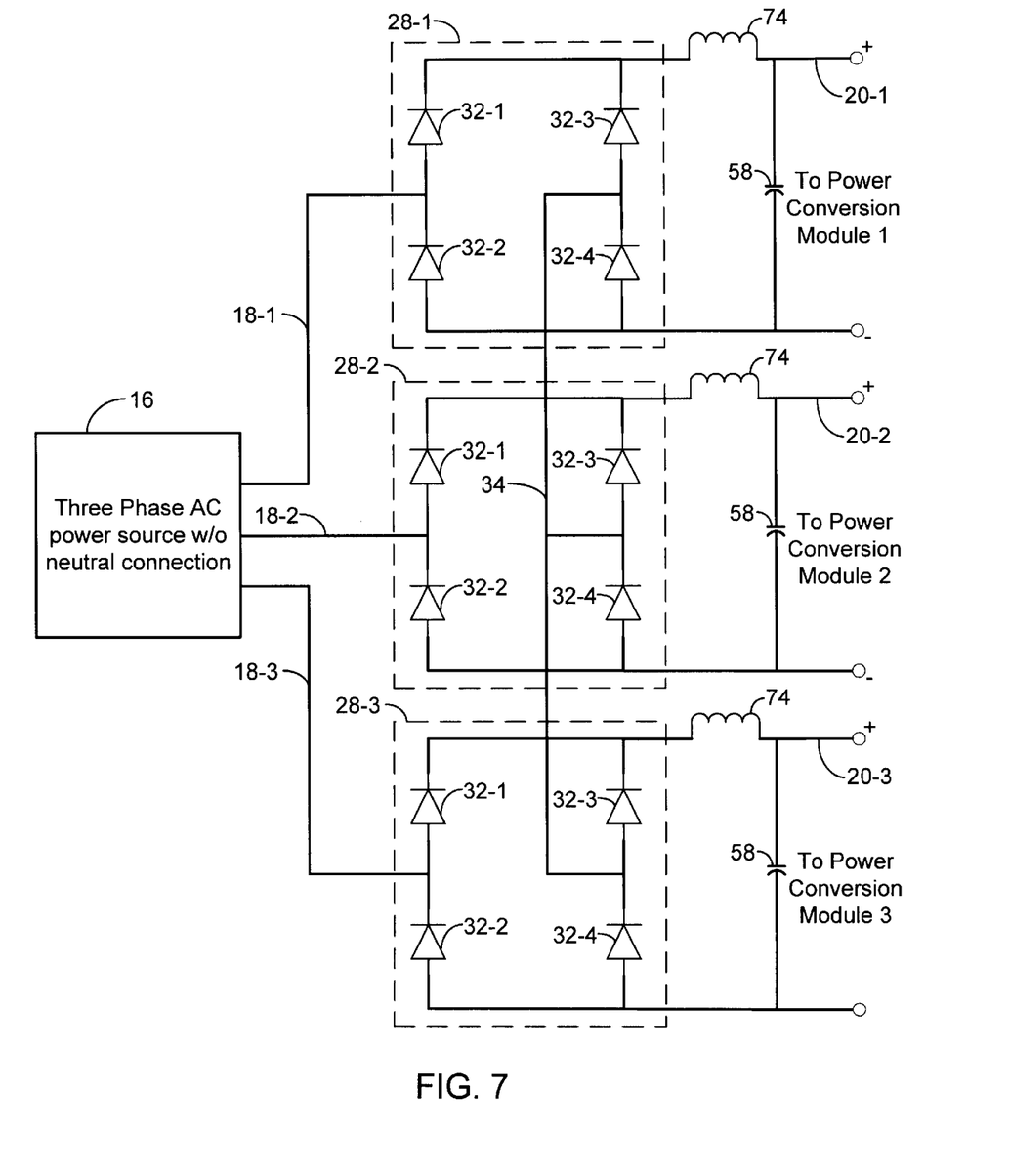
FIG. 7 is a schematic showing an inductor between the bridge rectifiers and the capacitors.
Figure 8:
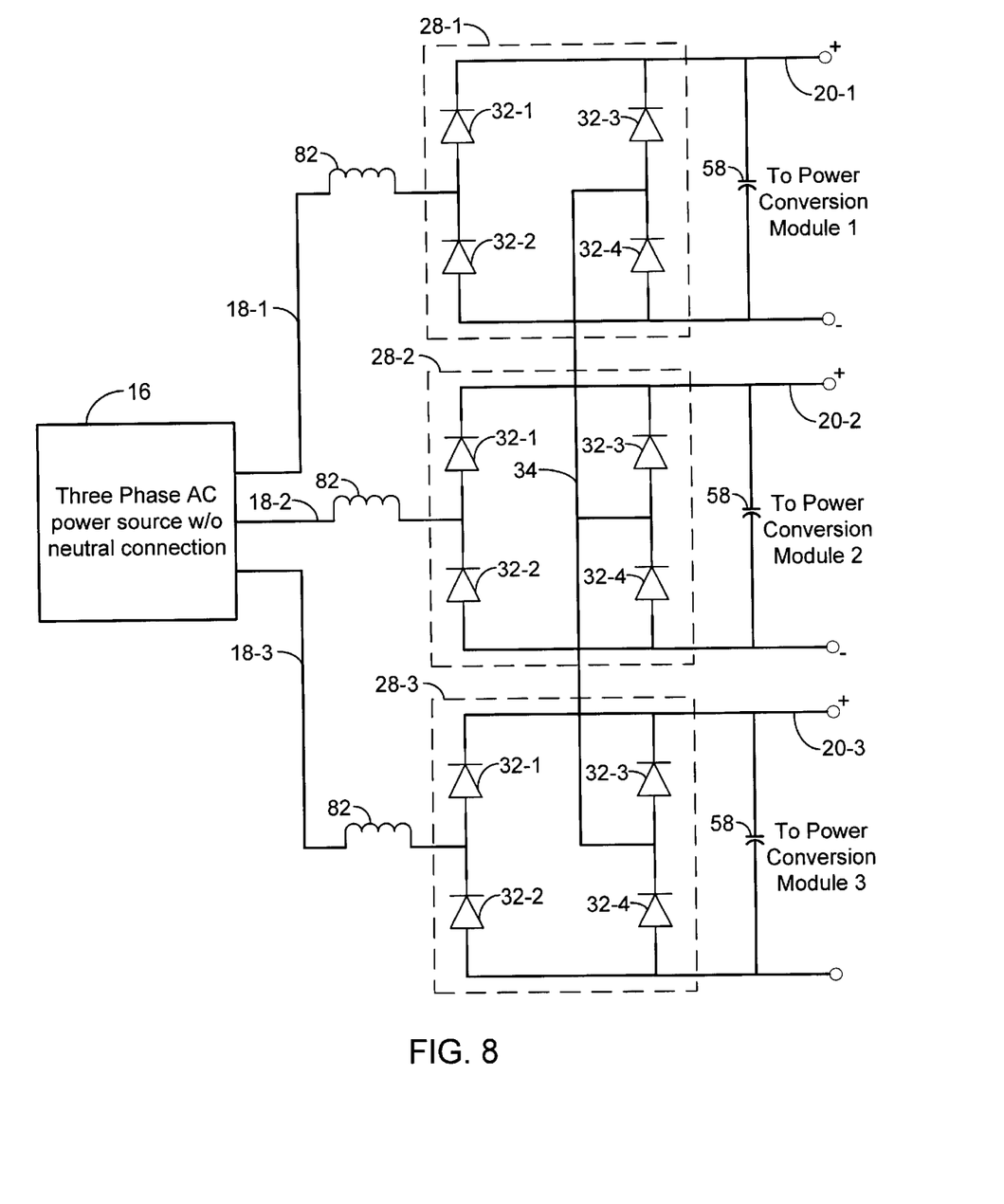
FIG. 8 is a schematic showing an inductor between the phases of the three phase AC power source and the bridge rectifiers.

Referring now to FIG. 7, inductors 74 can be optionally located between the bridge rectifiers 28-1, 28-2 and 28-3 and the capacitors 58 to further smooth the DC rail voltages 20-1, 20-2 and 20-3 that are produced by the capacitors 58. The inductors 74 decrease the ripples in the DC rail voltages 20-1, 20-2 and 20-3 that are produced by the capacitors 58 and that are shown in FIG. 6. Additionally, the inductors 74 increase the power factor. In FIG. 8, inductors 82 between the phases of the three phase AC power source 16 and the bridge rectifiers 28-1, 28-2 and 28-3 smooth the DC rail voltages 20-1, 20-2 and 20-3 that are filtered by the capacitors 58. The inductors 82 perform a similar function to the inductors 74 of the schematic in FIG. 7. The inductors 82 decrease the ripples in the DC rail voltage outputs 20-1, 20-2 and 20-3 that are produced by the capacitors 58 and increase the power factor of the rectifier circuit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A rectifier circuit for powering three power conversion modules using a three phase AC input without a neutral connection, said rectifier circuit comprising:

a first bridge rectifier that is connected to a first phase of said three phase AC input and that produces a first rectified waveform;

a second bridge rectifier that is connected to a second phase of said three phase AC input and that produces a second rectified waveform;

a third bridge rectifier that is connected to a third phase of said three phase AC input and that produces a third rectified waveform; and a connection between said first, second, and third bridge rectifiers that forms a virtual neutral.

2. The rectifier circuit as defined in claim 1 further comprising:

a first capacitor that is connected across said first bridge rectifier that filters said first rectified waveform and that creates a first DC rail voltage;

a second capacitor that is connected across said second bridge rectifier that filters said second rectified waveform and that creates a second DC rail voltage; and a third capacitor that is connected across said third bridge rectifier that filters said third rectified waveform and that creates a third DC rail voltage.

3. The rectifier circuit as defined in claim 2 wherein said first, second, and third DC rail voltages are of equal magnitude.

4. The rectifier circuit as defined in claim 2 wherein said first DC rail voltage feeds a first power conversion module, said second DC rail voltage feeds a second power conversion module, and said third DC rail voltage feeds a third power conversion module.

5. The rectifier circuit as defined in claim 4 wherein two of said first, second, and third power conversion modules remain powered at a decreased voltage level when the remaining on e of said first, second, and third power conversion modules fails.

6. The rectifier circuit as defined in claim 2 further comprising:
a first inductor that is connected between said first bridge rectifier and said first capacitor that smoothes said first DC rail voltage and increases a first power factor;
a second inductor that is connected between said second bridge rectifier and said second capacitor that smoothes said second DC rail voltage and increases a second power factor; and
a third inductor that is connected between said third bridge rectifier and said third capacitor that smoothes said third DC rail voltage and increases a third power factor.

7. The rectifier circuit as defined in claim 1 further comprising:
a first inductor that is connected between said first phase of said three phase AC input and said first bridge rectifier that smoothes said first DC rail voltage and increases a first power factor;
a second inductor that is connected between said second phase of said three phase AC input and said second bridge rectifier that smoothes said second DC rail voltage and increases a second power factor; and
a third inductor that is connected between said third phase of said three phase AC input and said third bridge rectifier that smoothes said third DC rail voltage and increases a third power factor.

8. The rectifier circuit as defined in claim 1 wherein said first, second, and third bridge rectifiers include:
first, second, third, and fourth diodes, each with an anode and a cathode,
wherein said anode of said first diode is connected to said cathode of said second diode, said cathode of said first diode is connected to said cathode of said third diode, said anode of said second diode is connected to said anode of said fourth diode, said anode of said third diode is connected to said cathode of said fourth diode, said anode of said first diode of said first bridge rectifier is connected to said first phase of said three phase AC input, said anode of said first diode of said second bridge rectifier is connected to said second phase of said three phase AC input, and said anode of said first diode of said third bridge rectifier is connected to said third phase of said three phase AC input.

9. The rectifier circuit of claim 8 wherein said virtual neutral includes a conductor connecting said anode of said third diode of said first bridge rectifier, said anode of said third diode of said second bridge rectifier, and said anode of said third diode of said third bridge rectifier.

10. A rectifier circuit for powering three power conversion modules using a three phase AC input without a neutral connection, said rectifier circuit comprising:
a first bridge rectifier that is connected to a first phase of said three phase AC input and that produces a first rectified waveform;
a second bridge rectifier that is connected to a second phase of said three phase AC input and that produces a second rectified waveform;
a third bridge rectifier that is connected to a third phase of said three phase AC input and that produces a third rectified waveform;
a connection between said first, second, and third bridge rectifiers that forms a virtual neutral;
a first capacitor that is connected across said first bridge rectifier that filters said first rectified waveform and that creates a first DC rail voltage;
a second capacitor that is connected across said second bridge rectifier that filters said second rectified waveform and that creates a second DC rail voltage; and
a third capacitor that is connected across said third bridge rectifier that filters said third rectified waveform and that creates a third DC rail voltage.

11. The rectifier circuit as defined in claim 10 wherein said first, second, and third DC rail voltages are of equal magnitude.

12. The rectifier circuit as defined in claim 10 wherein said first DC rail voltage feeds a first power conversion module, said second DC rail voltage feeds a second power conversion module, and said third DC rail voltage feeds a third power conversion module.

13. The rectifier circuit as defined in claim 12 wherein two of said first, second, and third power conversion modules remain powered at a decreased voltage level when the remaining one of said first, second, and third power conversion modules fails.

14. The rectifier circuit as defined in claim 10 further comprising:
a first inductor that is connected between said first bridge rectifier and said first capacitor that smoothes said first DC rail voltage and increases a first power factor;
a second inductor that is connected between said second bridge rectifier and said second capacitor that smoothes said second DC rail voltage and increases a second power factor; and
a third inductor that is connected between said third bridge rectifier and said third capacitor that smoothes said third DC rail voltage and increases a third power factor.

15. The rectifier circuit as defined in claim 10 further comprising:
a first inductor that is connected between said first phase of said three phase AC input and said first bridge rectifier that smoothes said first DC rail voltage and increases a first power factor;
a second inductor that is connected between said second phase of said three phase AC input and said second bridge rectifier that smoothes said second DC rail voltage and increases a second power factor; and
a third inductor that is connected between said third phase of said three phase AC input and said third bridge rectifier that smoothes said third DC rail voltage and increases a third power factor.

16. The rectifier circuit as defined in claim 10 wherein said first, second, and third bridge rectifiers include:
first, second, third, and fourth diodes, each with an anode and a cathode,
said anode of said first diode is connected to said cathode of said second diode, said cathode of said first diode is connected to said cathode of said third diode, said anode of said second diode is connected to said anode of said fourth diode, said anode of said third diode is connected to said cathode of said fourth diode, said anode of said first diode of said first bridge rectifier is connected to said first phase of said three phase AC input, said anode of said first diode of said second bridge rectifier is connected to said second phase of said three phase AC input, and said anode of said first diode of said third bridge rectifier is connected to said third phase of said three phase AC input.

17. The rectifier circuit of claim 16 wherein said virtual neutral includes a conductor connecting said anode off said third diode of said first bridge rectifier, said anode of said third diode of said second bridge rectifier, and said anode of said third diode of said third bridge rectifier.

18. A rectifier circuit for powering three power conversion modules using a three phase AC input without a neutral connection, said rectifier circuit comprising:

a first bridge rectifier that is connected to a first phase of said three phase AC input and that produces a first rectified waveform;

a second bridge rectifier that is connected to a second phase of said three phase AC input and that produces a second rectified waveform;

a third bridge rectifier that is connected to a third phase of said three phase AC input and that produces a third rectified waveform;

a connection between said first, second, and third bridge rectifiers that forms a virtual neutral;

a first capacitor that is connected across said first bridge rectifier that filters said first rectified waveform and that creates a first DC rail voltage;

a second capacitor that is connected across said second bridge rectifier that filters said second rectified waveform and that creates a second DC rail voltage;

a third capacitor that is connected across said third bridge rectifier that filters said third rectified waveform and that creates a third DC rail voltage;

said first, second, and third bridge rectifiers include first, second, third, and fourth diodes, each with an anode and a cathode, wherein said anode of said first diode is connected to said cathode of said second diode, said cathode of said first diode is connected to said cathode of said third diode, said anode of said second diode is connected to said anode of said fourth diode said anode of said third diode is connected to said cathode of said fourth diode, said anode of said first diode of said first bridge rectifier is connected to said first phase of said three phase AC input, said anode of said first diode of said second bridge rectifier is connected to said second phase of said three phase AC input, said anode of said first diode of said third bridge rectifier is connected to said third phase of said three phase AC input, and wherein said virtual neutral includes a conductor connecting said anode of said third diode of said first bridge rectifier, said anode of said third diode of said second bridge rectifier, and said anode of said third diode of said third bridge rectifier.

* * * * *

UNITED STATES PATENT AND TRADEMARK OFFICE
CERTIFICATE OF CORRECTION

PATENT NO.    : 6,501,192 B1　　　　　　　　　　　　　　　　　　　　Page 1 of 1
DATED         : December 31, 2002
INVENTOR(S)   : Vadim Lubomirsky It is certified that error appears in the above-identified patent and that said Letters Patent is hereby corrected as shown below:

Column 1,
Line 50, "$\sqrt{3}$" should be -- $\sqrt{3}$ --.

Column 2,
Line 64, "tile" should be -- the --.

Column 3,
Line 51, "1200" should be -- $120°$ --.

Column 5,
Line 9, "on e" should be -- one --.

Signed and Sealed this

Eighth Day of July, 2003

JAMES E. ROGAN
*Director of the United States Patent and Trademark Office*